May 27, 1958
P. ROBINSON
2,836,777
HIGH VOLTAGE SLUG CAPACITOR
Filed Sept. 10, 1956
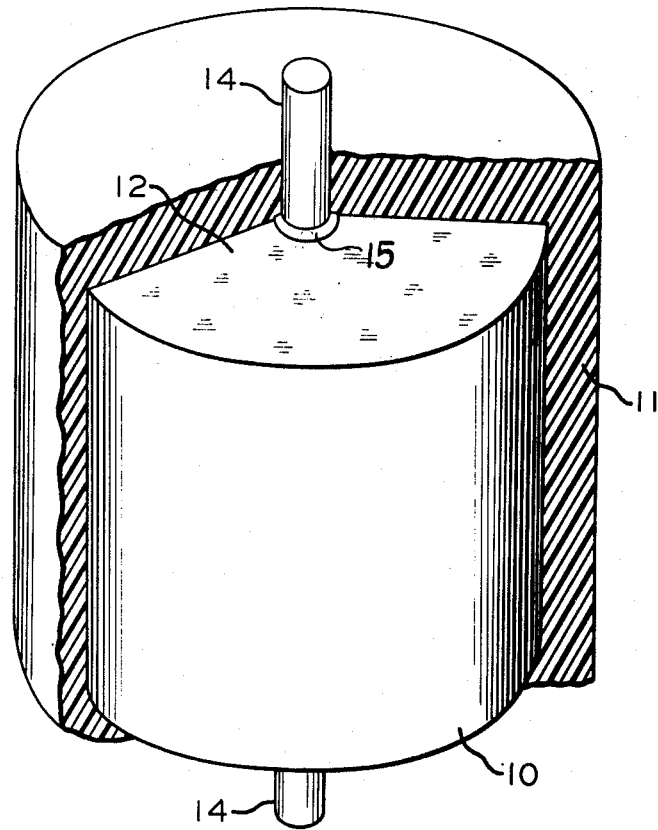
INVENTOR.
PRESTON ROBINSON
BY
Connolly and Hutz
HIS ATTORNEYS

United States Patent Office 2,836,777
Patented May 27, 1958

2,836,777

HIGH VOLTAGE SLUG CAPACITOR

Preston Robinson, Williamstown, Mass., assignor to Sprague Electric Company, North Adams, Mass., a corporation of Massachusetts Application September 10, 1956, Serial No. 608,908

3 Claims. (Cl. 317—242)

The present invention relates primarily to an improvement in the construction of the so-called "slug" type high voltage ceramic capacitors, and more particularly to improved means for preventing the failure of high voltage slug capacitors by breakdown through the ceramic slug.

These "slug" type capacitors are so designated because their general appearance resembles that of a slug of ceramic material. The dielectrics in these units are actually small cylinders of a high dielectric constant material, for example, a titanate ceramic. On the opposed ends of the cylinders employed in such capacitors, circular electrodes are applied by established techniques, such as silk screening. These electrodes have traditionally been of smaller diameter than the slug with the thinking being that this construction would provide a longer path around the slug. Terminals are then attached by soldering to these electrodes. The entire assembly is then encased in an appropriate casting or molding material.

While this construction is in general satisfactory and is an accepted capacitor design for high voltage electronic equipment, a serious deficiency of this design has been the failures which occur by breakdown of the ceramic slug due to corona around the electrodes. When capacitors of the indicated design, which have failed, are examined, it is seen that corona frequently takes place in a circle corresponding almost exactly in circumference to the circumference of the original silvered electrodes.

A previous attempt at correcting this corona breakdown deficiency has utilized an outer casing of a resin having a higher dielectric constant than the ceramic slug. These high dielectric constant resins have been produced by loading or filling polystyrene and epoxy resins with titanate ceramics. This scheme has met with no real success because of the molding difficulties encountered with the loaded resin, and because of the limitations on the capacitance of units so produced in that the highest practical dielectric constant obtainable is in the order of 300. Attempts to obtain higher dielectric constants produced resins which would not mold.

Another prior attempt at correcting the corona breakdown has been to place a ring of a high resistance material around the outer periphery of both of the silver electrodes employed at opposed ends of a ceramic dielectric in a so-called "slug" high voltage capacitor. This expedient lowers the voltage gradient at the edge of the conductive electrodes and by so doing materially reduces the chances of capacitor failure due to corona at the edge of the electrodes across the ceramic dielectric. This attempt has also not met with wide commercial success because it involves excessive expenditures of time and money in the application and curing of the resistance ring.

It is an object of the present invention to overcome the foregoing and related disadvantages of prior high voltage slug capacitor constructions. A further object is to produce new and improved high voltage ceramic capacitors which do not suffer from corona failure. These and other objects of the invention as well as the advantages of it will be apparent from this specification, the appended claims, and the accompanying drawing in which:

The figure shows an isomeric view partially in section of a new capacitor construction of the invention.

Broadly, the objects of this invention are achieved by providing a slug capacitor in which the opposed faces of the ceramic slug are silvered to the edge to provide opposed electrodes and in which the so silvered slug is encased in a resin having a higher conductivity than the ceramic so as to help prevent the concentration of stress at the edge of the electrodes.

The construction employed in my invention is better understood through reference to the drawing. Slug 10 is formed of a titanate ceramic having a dielectric constant of from 200 to 6000. Preferably slug 10 is formed of barium titanate having a dielectric constant of 3500. Slug 10 is then provided with electrodes 12, as by screening silver onto the opposed faces of the cylindrical slug. The screening procedure is well known in the ceramic art and forms no part of this invention. The extent of the screening however, is markedly different from the teachings of the art in that the silver extends to the edge of the face so as to substantially completely cover the entire face. Terminal leads 14 are then centrally affixed to electrode 12 by solder or other conventional means 15. The entire assemblage, except for exposed ends of leads 14, is then cast in an epoxy resin which is filled with an inert material such as silica to produce a coefficient of expansion which is the same or approximately the same as that of the ceramic.

This represents an important feature of my invention in that the epoxy resin will adhere very well to the ceramic and the electrodes, and by virtue of the equal coefficients of linear expansion, the resin will not place the ceramic under tension upon expansion due to heating caused by the high temperatures developed in cramped quarters in modern television and other high-voltage electronic equipment. Prior methods of encasing have utilized elaborate molding techniques with resins which, because of the differences in adhesion to the electrode and the ceramic and because of unlike linear expansion, caused tension in the ceramic. As is well known, ceramics are weak in tension and strong in compression. Expansion of these prior molded plastic cases, by virtue of greater adhesion to the electrodes than to the slug, would tension the slug and cause it to crack. The only solution to this problem that has been observed is to apply a layer of silicone mold release around the unit prior to molding. This is however, a solution which creates a larger problem, namely, the casing does not adhere to the capacitor section and consequently is of practically no value in preventing corona.

The resin 11 may also contain as a filler appreciable amounts of semi-conducting particles such as manganese ferrite, so as to provide a resin of higher conductivity than the ceramic. In this way the voltage gradient at the edge of the electrodes is further decreased, and the electrical stress is further shared by the resin, and corona failure is considerably reduced.

The resin 11 is of the epoxy type which are well known in the art and which need not be developed in this specification. The epoxy resins are adequately disclosed in the Buck et al. U. S. Patent No. 2,569,929, the Wyles Patent No. 2,528,934, the Greenlee Patent No. 2,542,664, the Bixler Patent No. 2,512,996, the Bender et al. Patent No. 2,506,486, the Greenlee Patent Nos. 2,510,885 and 2,510,886 and the Newey et al. Patent No. 2,553,718. Also see the Narracott article in British Plastics, October 1951, pages 341 through 345.

The epoxy resin makes up at least 50 percent by weight of the encasing material; with the filler material, both inert and semi-conductor, making up at least another 40 percent; and a catalyst or hardener making up the remainder.

A particularly advantageous encasing or casting compound is 47.6% resin; 45.2% filler, utilizing semi-conductors having resistivity of $10^8$ ohms centimeters as 25% of the filler; and a hardener making up the remaining 7.2%.

The slug 10 with electrodes 12 and terminals 14 is cast in the resin 11 in simple aluminum or other metal forms. The resin is then cured in two stages. The first stage consists of a heat treatment at 40° C. for 2½ hours to set the resin. The units are then removed from the forms, thereby freeing them for reuse every 2½ hours as opposed to prior molding procedures which tied-up molds for 18 or more hours. The second stage of curing consists of a batch cure at 125° C. for 12 hours.

In operation, the combination of complete-end-coverage electrodes and high dielectric-low resistance resin casing which adheres uniformly over the entire surface of the capacitor section provides extremely corona free service. The casing serves to decrease the field density at the edge of the electrode so as to get maximum breakdown voltage.

The external leakage resistance between the terminals 14 may be considerably increased by increasing the leakage path. One highly effective means for increasing the path is to cast, or later machine, concentric grooves into the exterior of the casing.

These units are free of corona failure at normal operation at voltages found in color TV and other high voltage electronic equipment. Moreover, the units may be flashed at voltages of 35 to 40 kv. without corona failure.

This electrical-stress sharing resin is not restricted to slug type capacitors, but may also be used to prevent corona breakdown in high-voltage (10 to 40 kv.) electrolytic units.

As many apparently widely different embodiments of my invention may be made without departing from the spirit and scope hereof, it is to be understood that my invention is not limited to the specific embodiments hereof except as defined in the appended claims.

What is claimed is:

1. An electrical capacitor comprising a substantially rigid body of high dielectric constant material having opposed end faces, opposed conductive electrodes positioned on and substantially completely covering said end faces, electrode leads connected to the electrodes and extending away from the dielectric body, a casing enveloping said body and electrodes and having a dielectric constant lower than said body and having a higher conductivity than said body and having a coefficient of linear expansion substantially equal to that of said body.

2. The capacitor of claim 1 in which said body comprises barium titanate.

3. The capacitor of claim 1 in which said casing comprises an epoxy resin filled with an inert filler and a minor amount of a semi-conductive material.

References Cited in the file of this patent

UNITED STATES PATENTS

| 1,567,293 | Pfiffner | Dec. 29, 1925 |

FOREIGN PATENTS

| 123,619 | Australia | Feb. 17, 1947 |